United States Patent Office 2,960,545
Patented Nov. 15, 1960

2,960,545
DEMETHYLATION PROCESS FOR PSEUDO-CUMENE

Frank H. Seubold, Jr., Claremont, Calif., assignor to Union Oil Company of California, Los Angeles, Calif., a corporation of California No Drawing. Filed Nov. 17, 1958, Ser. No. 774,086

6 Claims. (Cl. 260—672)

This invention relates to new methods for selectively demethylating pseudocumene (1,2,4-trimethyl benzene) to produce mainly xylenes, and particularly to methods which favor the formation of para-xylene in preference to meta-xylene and ortho-xylene. In broad aspect, the process is a selective hydrodealkylation wherein pseudocumene is contacted with a hydrogenating catalyst having selectively retarded cracking activity, in the presence of added steam and hydrogen. The dealkylation takes place under conditions of elevated temperatures, and selected pressures and space velocities as hereinafter defined.

Para-xylene has in recent years become a chemical of great importance, mainly because it is the primary raw material for the manufacture of terephthalic acid, as well as other para-disubstituted benzenes. Para-xylene is conventionally prepared by fractional crystallization from mixtures with its other isomers, i.e., o-xylene, m-xylene and ethylbenzene. These mixtures are ordinarily obtained by distillation from coal tar, or from naphtha reformates. The amount of para-xylene present is nearly always between about 15% and 25%. In the recovery of para-xylene by fractional crystallization, difficulty is encountered because of the complexity of the mixture and the formation of eutectics. The result is that, as a practical matter, it is impossible to recover economically more than about 65% of pure para-xylene from such mixtures. According to the present invention, a less complex mixture of xylenes is produced, i.e. one which is free of ethylbenzene, and one which moreover contains a substantially higher proportion of para-xylene than would be present at thermodynamic equilibrium. In general, the product xylenes produced herein contain between about 30–45% of para-xylene, whereas the equilibrium proportion under the dealkylation conditions employed is about 18–22%.

The advantage inherent in producing mixtures rich in para-xylene can be appreciated by comparing the relative amounts of pure para-xylene which can be recovered therefrom by fractional crystallization. For example, where it is possible to recover only about 65% of the para-xylene present in a crude mixture containing 20% thereof, it is possible under the same conditions to recover 76% of the para-xylene present in a mixture originally containing 40% thereof. Moreover, the remaining mother liquor from the crystallization contains only xylenes, and is free of ethylbenzene. Hence, this mother liquor may conveniently be used as an isomerization feedstock for the production of additional para-xylene from the ortho- and meta-xylenes. Mixtures containing ethylbenzene are very refractory stocks for isomerization purposes, because transalkylation and/or disproportionation results in the production of ethyl-xylenes and other complex products.

Another advantage of the process of this invention resides in the cheapness and ready availability of the raw material, pseudocumene. Pseudocumene occurs in substantial quantities (e.g. 5–15%) in naphtha reformates, and can readily be isolated therefrom since no close boiling isomers are present.

From the foregoing it will be apparent that the principal object of this invention is to provide methods for the selective mono-demethylation of pseudocumene, whereby the product is almost wholly xylenes, with little or no benzene or toluene. A further object is to provide optimum dealkylation conditions which favor the formation of para-xylene rather than ortho- and meta-xylenes. Still another object is to provide suitable dealkylation catalysts and conditions, which in addition to the foregoing, will also minimize isomerization and transalkylation. A broader object is to provide a more plentiful and economical source of para-xylene. Still another object is to provide methods for preparing xylenes free of ethylbenzene. Another object is to provide mixed xylenes from which a maximum amount of pure para-xylene can be recovered economically by fractional crystallization. Other objects and advantages will be apparent from the more detailed description which follows.

The hydrodealkylation of pseudocumene can result in many undesired side reactions. Among these are: (1) the removal of more than one methyl group; (2) the isomerization of the xylenes formed to a thermodynamic equilibrium mixture; (3) transalkylation, whereby products containing more than three methyl groups, and less than two methyl groups are formed; (4) scission of the benzene ring resulting in the production of coke and methane. The process conditions herein described and the catalysts used, are particularly designed to minimize all of the foregoing undesired side reactions, while favoring the attainment of the objects outlined above. Undesirable cracking and/or scission of the benzene ring is prevented by the use of controlled amounts of steam, and by adding controlled amounts of alkali to the catalyst. Isomerization and transalkylation are inhibited mainly by controlling the acidity of the catalyst, as well as by limiting the temperature and/or contact time so as to provide for a total conversion per pass of not more than about 35%. The conditions of temperature, pressure, space velocity, steam ratios and hydrogen ratios are suitably adjusted as hereinafter defined to obtain the desired objectives.

The process may be carried out in any suitable type of reactor which is adapted for contacting gases with solids at high temperatures. Either continuous or cyclic operation may be desired. In continuous moving-bed operation, the catalyst in granular form is contacted countercurrently or concurrently while flowing through the reactor with a stream of the reactant gases, and product gases are removed near the opposite end of the reactor. Heat may be supplied by suitable preheating of the feed, or by internal or external heating of the reactor itself. Catalyst removed from the solids outlet end of the reactor may then be regenerated and recycled to the solids-inlet end of the reactor.

Preferably, however, the contacting is carried out using a fixed bed of granular catalyst, with periodic regeneration thereof to remove coke and other deactivating deposits. In cyclic operation a plurality of stationary beds of catalyst are employed, whereby one or more of the units may be maintained on stream at all times while others are undergoing regeneration or cleaning operations.

The catalysts employed herein comprise as a primary ingredient, an active metal hydrogenation catalyst or compound thereof, which metal may be any of the transitional, or heavy metals, i.e., those having an atomic weight of 22 or above. A preferred class of metals consists of those belonging to groups VI—B and VIII of the periodic table. These metals are chromium, molybdenum, tungsten, uranium, iron, cobalt, nickel, ruthenium, rhodium, palladium, osmium, iridium and platinum. They are preferably employed in the form of their oxides, but the free metals in finely divided form may be employed, or other compounds thereof such as the sulfides, phosphides, phosphates or sulfates. Molybdenum in the form of molybdic trioxide, either alone or supported on a carrier, is found to be a most highly effective catalyst, especially when promoted with other metals or metal oxides such as cobalt oxide, nickel oxide, iron oxide, and chromia. For example, a molybdic oxide and cobalt oxide containing catalyst prepared by alternately impregnating the carrier with molybdenum and cobalt salts is found to be highly active.

The above metals or their oxides are deposited on an amorphous, gel-type carrier such as alumina, silica gel, zirconia, thoria, magnesia, titania, montmorillonite clay, bauxite, diatomaceous earth, or any other material which has no adverse effect on the reaction and displays some cracking activity. The carriers found to be most effective are those made up predominantly of precipitated, gel-type alumina. Such gel aluminas usually have surface areas over 100 sq. meters/gram when measured by gas adsorption. Alumina gels containing between about 1% and 15%, and preferably between about 3% and 8% of coprecipitated silica are especially suitable carriers. The presence of the small amount of silica in the alumina appears to heat-stabilize the resulting catalyst, and prolongs its life as is described in U.S. Patent No. 2,437,532.

In the preferred method for the preparation of catalyst, an impregnation procedure is employed wherein the dried carrier is immersed in an aqueous solution containing a soluble salt of the desired metal, and the impregnated carrier is thereafter separated from the solution, dried and calcined to reduce the impregnated metal salt to an oxide or the free metal.

If the catalyst is prepared by impregnation of a carrier with an aqueous solution, the concentration of active metal or metals in the impregnation solution will depend upon the particular carrier being employed and upon the desired concentration of active metal in the finished catalyst. In using molybdenum or chromium it is preferred that the catalyst should contain between about 0.4% to 50% of the active metal. For this purpose the impregnation solution may contain between about 2 and 120 grams of metal salts per 100 ml. of solution.

Although the impregnation methods described above are preferred, other methods may be employed such as coprecipitation, co-pilling, sublimation, etc. For example, a hydrous alumina gel may be mixed with an aqueous solution of chromic nitrate, for example, and the mixture dried at 200° F. to 300° F. to obtain a highly active chromia-alumina catalyst. In general any method for preparing active hydrogenation catalysts of limited cracking activity may be employed herein.

The catalysts prepared as above described all display a greater or lesser degree of cracking activity by virtue of the acidic cracking centers on the carrier. In the process of this invention it is found desirable to partially poison this cracking activity in order to gain selectivity for demethylation as opposed to ring scission. This is found also to inhibit isomerization and transalkylation to a greater degree than the desired demethylation. To achieve these results any suitable alkali may be added to the catalyst, preferably one selected from the hydroxides and alkaline salts of the alkali metals or the alkaline earth metals. Specifically the hydroxides, carbonates, phosphates and sulfides of sodium, potassium, lithium, calcium, strontium, barium and magnesium may be employed. These materials are preferably used in very minor proportions, i.e., below about 5% by weight, and preferably between about 0.01% and 2% by weight. Those skilled in the art will readily appreciate that the carriers described above vary considerably in acidity and it is hence preferred to use larger amounts of alkali for such highly active cracking catalysts as silica-alumina or silica-magnesia, while lesser proportions will be used for materials having a lesser cracking activity such as alumina, zirconia, silica or the like.

If an alkali metal hydroxide is to be incorporated into the catalyst, this may be done by impregnation at any stage of the catalyst manufacture, or by coprecipitation or co-pilling. Preferably the alkali metal hydroxide is impregnated onto the catalyst after the other active metals have been incorporated. After addition of the alkali metal the catalyst may be prepared for use by drying at 200° F. to 300° F., and preferably calcining at temperatures from 600° F. to 1500° F.

The operative reaction conditions include pressures ranging between about 100 and 5,000 pounds per square inch gauge (p.s.i.g.), temperatures between about 850° F. and 1075° F., and liquid hourly space velocities (LHSV), between about 0.2 and 8 volumes of feed per volume of catalyst per hour. Pressures between about 500 and 2,000 p.s.i.g. are generally preferred. The preferred temperature range is between about 875° F. and 975° F. The preferred space velocities in most cases range between about 0.5 and 3.0. Those skilled in the art will readily appreciate that all of these factors are interrelated, and should be correlated for each specific operation. Thus, low space velocities, high pressures and high temperatures cooperate in the direction of producing more severe operating conditions, while high space velocities, low pressures, and low temperatures tend to produce opposite results.

Hydrogen is employed in amounts ranging from about 0.5 to 10 moles per mole of pseudocumene, preferably between about 2 and 8 moles. The higher hydrogen ratios will preferably be employed when the reaction is conducted at relatively low pressures, and conversely when operating at high pressures, somewhat lower hydrogen ratios may be employed.

The operative steam ratios range between about 0.3 and 20 moles thereof per mole of pseudocumene. When operating within the preferred pressure ranges from about 500 and 2,000 p.s.i.g., it is preferred to use about 1.0 to 6 moles of steam per mole of pseudocumene. The optimum steam ratio may also depend to some extent upon the specific catalyst, the hydrogen partial pressure and the temperature. These factors should be correlated and balanced in each specific case.

The process variables, temperature and space velocity are further correlated within the above limits so as to limit the overall conversion to less than about 35% per pass, preferably between about 10% and 30%. This provides an optimum selectivity, both for the production of xylenes in preference to benzene and toluene, and for the production of p-xylene in preference to o- and m-xylenes. Those skilled in the art will readily understand that conversion is controlled at a predetermined maximum figure by using low temperatures with low space velocities, and high temperatures with high space velocities, all within the previously defined limits.

It is especially preferred to employ high temperatures correlated with high space velocities, i.e. temperatures between about 950 and 1,050° F. at space velocities between about 2 and 6. This is found to permit higher overall conversions per pass while attaining higher yields of xylenes and higher p-xylene ratios, as compared to operations in the low temperature, low space velocity ranges.

"Conversion" as used herein means the percent of feed pseudocumene which is converted to all other products. The "yield" of any given product is the percent of the converted pseudocumene which was converted to that particular product.

The process may perhaps be better understood from the following examples, which should not, however, be considered as in any way limiting the scope of the invention.

EXAMPLE I

To demonstrate the critical effect of degree of conversion per pass on isomer distribution in the product, several demethylation runs were carried out at the same pressure (1,000 p.s.i.g.), hydrogen rates (4 moles per mole of pseudocumene) and steam rates (4 moles per mole of pseudocumene), and using the same catalyst. Temperatures and/or space velocities were varied to obtain different degrees of conversion, as indicated in Table 1. The catalyst in all cases was molybdenum oxide (9% by weight) plus cobalt oxide (3%), impregnated on a coprecipitated alumina-silica carrier (95% $Al_2O_3$—5% $SiO_2$). The catalyst also contained 0.2% by weight of sodium hydroxide impregnated thereon. The results were as follows:

Table 1

| Run No | 1 | 2 | 3 |
|---|---|---|---|
| LHSV [1] | 1 | 2 | 2 |
| Temp., °F | 950 | 940 | 1,045 |
| Conversion, mole-percent | 38.5 | 23 | 62 |
| Xylene yield, mole-percent | 73 | 83 | 69 |
| Isomer distribution in xylene fraction: | | | |
| p-xylene | 33 | 37 | 31 |
| m-xylene | 51 | 48 | 52 |
| o-xylene | 16 | 15 | 16 |

[1] Volumes of liquid pseudocumene per volume of catalyst per hour.

The foregoing clearly demonstrates that the maximum proportion of p-xylene, as well as maximum xylene yields, are obtained only at relatively low total conversions per pass. In none of these runs was any detectable amount of tetra-alkyl benzenes found in the product.

EXAMPLE II

Run No. 2 above was repeated, using the same $CoO$—$MoO_3$ catalyst, except that no alkali was added thereto. The conversion was 28%, and the xylene yield, 76%, but the xylene fraction contained only 31% of the p-xylene (run No. 4). This example demonstrates that even at the preferred conversion level, the desired results are not obtainable without the addition of alkali to the catalyst.

EXAMPLE III

In another series of runs, pseudocumene was contacted with a catalyst identical to that of Example I, except that a larger quantity of sodium hydroxide (2.6% by weight) was added thereto. The pressure in all runs was 1,000 p.s.i.g., the hydrogen rate was 4 moles per mole of pseudocumene (except in the case of run No. 6), and the steam rate was 4 moles per mole of pseudocumene. The results at various conversion levels were as follows:

Table 2

| Run No | 5 | 6 [1] | 7 | 8 |
|---|---|---|---|---|
| LHSV | 1 | 2 | 2 | 2 |
| Temp., °F | 940 | 950 | 950 | 1,000 |
| Conversion, mole-percent | 16.6 | 13 | 13.4 | 26.7 |
| Xylene yield, mole-percent | 88 | 95 | 94 | 92 |
| Isomer distribution in xylene fraction: | | | | |
| p-xylene | 34.5 | 39.2 | 38.2 | 35.5 |
| m-xylene | 51.8 | 48.0 | 46.7 | 48.0 |
| o-xylene | 13.7 | 12.8 | 15.2 | 15.2 |

[1] Hydrogen rate was 2 moles per mole of pseudocumene.

Again it is apparent that xylene yields, and the p-xylene content thereof, are highest at conversion levels below about 35%. By comparing runs 5 and 8, it will be apparent also that higher conversions, better yields, and a slightly more favorable isomer distribution are obtainable with the high temperature-high space velocity combination (run 8) than with the low temperature-low space velocity combination (run 5).

The catalyst at the end of runs 5–8 was found to contain only 0.14% by weight of coke. A much higher coke content is found when the steam is omitted, and/or when alkali is omitted from the catalyst.

Results analogous to those shown in the foregoing examples are obtained when other catalysts within the purview of the general disclosure are substituted for those of the examples. In all cases, a substantial increase in the para-xylene content of the xylene fraction is noted, as well as an increased yield of xylenes, when operating under the specified conditions and at the specified low conversion levels. It is hence not intended to limit the invention to the details of the examples. The true scope of the invention is intended to be embraced by the following claims.

I claim:

1. A method for the selective demethylation of pseudocumene to obtain maximum yields of p-xylene, which comprises contacting a reaction mixture of pseudocumene, hydrogen and steam with a hydrodealkylation catalyst at a temperature between about 950° and 1050° F., a liquid hourly space velocity between about 0.2 and 8 and at superatmospheric pressures between about 500 and 2000 p.s.i.g., and further controlling said temperature and space velocity variables within the aforesaid limits in order to provide a total conversion per pass greater than 10% but not greater than about 35%, and recovering a xylene fraction from the resulting product, said catalyst consisting essentially of (1) a major proportion of an amorphous gel-type oxide carrier having cracking activity and consisting mainly of alumina gel, (2) a minor proportion of a transitional metal hydrogenating component selected from the class consisting of the oxides and sulfides of the Group VIB and Group VIII metals and (3) a minor proportion of an added alkaline material, the mole ratio of steam/pseudocumene in said reaction mixture being between about 0.3 and 20.

2. A process as defined in claim 1 wherein said alkaline material is selected from the class consisting of the hydroxides and alkaline salts of the alkali metals and the alkaline earth metals.

3. A process as defined in claim 1 wherein said catalyst consists essentially of a major proportion of coprecipitated alumina-silica gel carrier, a minor proportion of the mixed oxides of molybdenum and cobalt, and a minor proportion of an alkali metal hydroxide.

4. A method for the selective demethylation of pseudocumene to obtain maximum yields of p-xylene, which comprises contacting a reaction mixture of pseudocumene, hydrogen and steam with a hydrodealkylation catalyst at a temperature between about 950° and 1050° F., a liquid hourly space velocity between about 2 and 6 and at superatmospheric pressures between about 500 and 2000 p.s.i.g., and further controlling said temperature and space velocity variables within the aforesaid limits in order to provide a total conversion per pass greater than 10% but not greater than about 35%, and recovering a xylene fraction from the resulting product, said catalyst consisting essentially of (1) a major proportion of an amorphous gel-type oxide carrier having cracking activity and consisting mainly of alumina gel, (2) a minor proportion of a transitional metal hydrogenating component selected from the class consisting of the oxides and sulfides of the Group VIB and Group VIII metals and (3) a minor proportion of an added alkaline material, the mole ratio of steam/pseudocumene in said reaction mixture being between about 0.3 and 20.

5. A process as defined in claim 4 wherein said alkaline material is selected from the class consisting of the hydroxides and alkaline salts of the alkali metals and the alkaline earth metals.

6. A process as defined in claim 4 wherein said catalyst consists essentially of a major proportion of coprecipitated alumina-silica gel carrier, a minor proportion of the mixed oxides of molybdenum and cobalt, and a minor proportion of an alkali metal hydroxide.

References Cited in the file of this patent

UNITED STATES PATENTS 2,734,929   Doumani _____ Feb. 14, 1956